UNITED STATES PATENT OFFICE.

EDWARD D. KENDALL, OF ELIZABETH, NEW JERSEY, ASSIGNOR OF TWENTY-TWO ONE-HUNDREDTHS TO DICKSON Q. BROWN, OF NEW YORK, N. Y., AND ONE-THIRD TO ALBERT R. LEDOUX, OF CORNWALL, NEW YORK.

COMPOSITION OF MATTER.

1,103,903.     Specification of Letters Patent.     Patented July 14, 1914.

No Drawing.     Application filed November 3, 1911. Serial No. 658,371.

*To all whom it may concern:*

Be it known that I, EDWARD D. KENDALL, a citizen of the United States, residing at Elizabeth, in the county of Union and State of New Jersey, have invented a new and useful Composition of Matter to be Used as a Substitute for Caoutchouc, the object of my invention being to provide a cheap composition capable of being vulcanized and that may be utilized in the manufacture of many articles for which caoutchouc is used.

My said composition of matter consists of guayule, balata, asphaltum, wax-tailings, (known also as "still-wax") and sulfur or a sulfur-bearing body. In preparing my said composition I preferably first soften the guayule and balata in one vessel and the asphaltum and wax-tailings in another vessel with any suitable volatile liquid solvent (such as petroleum-naphthas, benzol or its homologues, carbon disulfid, carbon tetrachlorid, etc.) and then mix all of these constituents, with the addition of sulfur (or a suitable sulfur-bearing body) and thoroughly incorporate the same by energetic stirring; if this mechanical agitation be accompanied by the application of moderate heat, or if it be conducted in a current of warm air, or for a longer period of time under ordinary atmospheric conditions, the said softening volatile solvent evaporates and leaves a caoutchouc-like mass which may be pressed or otherwise formed into different articles and vulcanized in molds or otherwise like prepared caoutchouc which has been charged with sulfur. After mixing the constituents of my said composition and before complete evaporation of the said solvent the composition is in the state of a viscous, adhesive mass which, being spread on cloth or canvas and exposed to air, particularly a current of warm air, loses all of the solvent by evaporation and the cloth or canvas so prepared, before or after being formed into useful articles, being subjected to the usual processes of vulcanization becomes a water-proofed fabric; the final products may be clothing, boots and overshoes, garden hose, carriage covers, tarpaulins, etc.

Instead of using a volatile solvent liquid in the preparation of my above described composition this may be prepared by melting together the asphaltum and wax-tailings, then adding guayule and balata, each in comminuted form, stirring all together, with continued heat, until thoroughly incorporated, then removing the source of heat and before the mass shall have become cold and while it is still soft adding and forcibly stirring in the required proportion of sulfur or sulfur-bearing chemical.

In preparing my herein described composition I preferably use the following proportions of its constituents, viz: guayule, twenty-two parts; balata, twenty parts; asphaltum, twelve to twenty-four parts; wax-tailings, eight to twenty parts; sulfur, two to eight parts: all by weight. These proportions may be varied without departing from my invention: increased proportions of wax-tailings and guayule impart softness and adhesiveness to the resulting product: larger proportions of asphaltum and balata and particularly of sulfur give hardness; my composition may thus be modified for varied uses.

I claim—

The herein described composition of matter, for use as a substitute for caoutchouc, consisting of guayule, twenty-two parts; balata, twenty parts; asphaltum, twelve to twenty-four parts; wax-tailings, eight to twenty parts; sulfur, two to eight parts, substantially as described.

EDWARD D. KENDALL.

Witnesses:
   W. R. WRUEPH,
   RODOLFO TAVANY.